US011901104B2

(12) United States Patent
Ishida et al.

(10) Patent No.: US 11,901,104 B2
(45) **Date of Patent: *Feb. 13, 2024**

(54) COMPOSITE MAGNETIC MATERIAL AND INDUCTOR USING THE SAME

(71) Applicant: Murata Manufacturing Co., Ltd., Kyoto-fu (JP)

(72) Inventors: Takuya Ishida, Nagaokakyo (JP); Mikito Sugiyama, Nagaokakyo (JP); Mitsuru Odahara, Nagaokakyo (JP); Hideaki Ooi, Nagaokakyo (JP); Koichi Ida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,169

(22) Filed: Feb. 21, 2023

(65) Prior Publication Data

US 2023/0207168 A1 Jun. 29, 2023

Related U.S. Application Data

(63) Continuation of application No. 16/833,323, filed on Mar. 27, 2020, now Pat. No. 11,631,513.

(30) Foreign Application Priority Data

Mar. 28, 2019 (JP) ................................ 2019-064582

(51) Int. Cl.
*H01F 1/24* (2006.01)
*H01F 1/153* (2006.01)
(Continued)

(52) U.S. Cl.
CPC ................ *H01F 1/24* (2013.01); *B22F 1/052* (2022.01); *B22F 1/08* (2022.01); *B22F 1/16* (2022.01);
(Continued)

(58) Field of Classification Search
None
See application file for complete search history.

(56) References Cited

U.S. PATENT DOCUMENTS 10,006,110 B2 6/2018 Lin et al.
10,685,768 B2 6/2020 Ishida
(Continued)

FOREIGN PATENT DOCUMENTS

CN 106816277 A 6/2017
CN 108735428 A 11/2018
(Continued)

OTHER PUBLICATIONS

An Office Action mailed by the Korean Intellectual Property Office dated Mar. 16, 2021, which corresponds to Korean Patent Application No. 10-2020-0036202 and is related to U.S. Appl. No. 16/833,323 with English language translation.

*Primary Examiner* — Kevin M Bernatz
(74) *Attorney, Agent, or Firm* — Studebaker & Brackett PC

(57) ABSTRACT

A magnetic material and an inductor capable of attaining both higher magnetic permeability and improved DC superposition characteristics. A composite magnetic material contains metal magnetic particles, in which the metal magnetic particles include first particles having a median diameter $D_{50}$ of 1.3 μm or more and 5.0 μm or less (i.e., from 1.3 μm to 5.0 μm), and second particles having a median diameter $D_{50}$ larger than the first particles. The first and second particles each include a core portion made of a metal magnetic material, and an insulating film provided on a surface of the core portion. The insulating film of the second particles has an average thickness of 40 nm or more and 100 nm or less (i.e., from 40 nm to 100 nm). The insulating film of the first
(Continued)

particles has an average thickness smaller than that of the insulating film of the second particles.

20 Claims, 5 Drawing Sheets

(51) Int. Cl.

| | |
|---|---|
| ***H01F 27/255*** | (2006.01) |
| ***H01F 1/058*** | (2006.01) |
| ***B22F 1/08*** | (2022.01) |
| ***B22F 1/16*** | (2022.01) |
| ***B22F 1/052*** | (2022.01) |
| *B22F 1/10* | (2022.01) |

(52) U.S. Cl.
CPC ......... *H01F 1/058* (2013.01); *H01F 1/15375* (2013.01); *H01F 27/255* (2013.01); *B22F 1/10* (2022.01); *Y10T 428/32* (2015.01)

(56) References Cited

U.S. PATENT DOCUMENTS

| | | | | |
|---|---|---|---|---|
| 11,183,320 B2 * | 11/2021 | Tonoyama | ................ | B22F 1/07 |
| 11,631,513 B2 * | 4/2023 | Ishida | ..................... | H01F 1/058 336/83 |
| 11,680,307 B2 * | 6/2023 | Tonoyama | ................ | H01F 1/20 428/692.1 |
| 2013/0249662 A1 | 9/2013 | Tonoyama et al. | | |
| 2014/0286814 A1 | 9/2014 | Kotani et al. | | |
| 2016/0155549 A1 | 6/2016 | Kato et al. | | |
| 2017/0154720 A1 | 6/2017 | Ohkubo et al. | | |
| 2017/0309387 A1 | 10/2017 | Nakabayashi et al. | | |
| 2018/0308610 A1 | 10/2018 | Ishida et al. | | |
| 2019/0096566 A1 | 3/2019 | Odahara et al. | | |
| 2020/0269316 A1 | 8/2020 | Saito et al. | | |
| 2021/0043362 A1 | 2/2021 | Mizukoshi et al. | | |
| 2022/0059265 A1 | 2/2022 | Sugiyama et al. | | |
| 2022/0165474 A1 | 5/2022 | Satou et al. | | |

FOREIGN PATENT DOCUMENTS

| | | | |
|---|---|---|---|
| JP | 2005-303006 | A | 10/2005 |
| JP | 2016-162764 | A | 9/2016 |
| JP | 2018-182203 | A | 11/2018 |
| KR | 10-2017-0063314 | A | 6/2017 |
| KR | 10-2018-0025068 | A | 3/2018 |
| TW | 201612335 | A | 4/2016 |
| TW | 201618133 | A | 5/2016 |

* cited by examiner

COMPOSITE MAGNETIC MATERIAL AND INDUCTOR USING THE SAME

CROSS-REFERENCE TO RELATED APPLICATION

This application is a Continuation of U.S. patent application Ser. No. 16/833,323 filed Mar. 27, 2020, now U.S. Pat. No. 11,631,513, which claims benefit of priority to Japanese Patent Application No. 2019-064582, filed Mar. 28, 2019, the entire content of which is incorporated herein by reference.

BACKGROUND

Technical Field

The present disclosure relates to a composite magnetic material and an inductor using the same.

Background Art

A composite magnetic material is used as an element body material of coil components such as inductors. Japanese Patent Application Laid-Open No. 2016-162764 discloses a magnetic powder mixed resin material obtained by dispersing and mixing soft magnetic powder in a resin, in which the soft magnetic powder is composed of a large number of soft magnetic particles forming a particle size distribution having two peaks. When soft magnetic particles having the first peak particle diameter of the larger one of the two peaks are defined as first particles, and soft magnetic particles having the second peak particle diameter of the smaller one of the two peaks are defined as second particles, the first particles are each covered with a nonmagnetic film, and the second particles are not each covered with a nonmagnetic film or are each covered with a nonmagnetic film thinner than the nonmagnetic film that covers the first particle.

SUMMARY

Magnetic characteristics required for coil components such as inductors include magnetic permeability and DC superposition characteristics. However, the inventors have found that it is difficult to simultaneously attain both higher magnetic permeability and improved DC superposition characteristics.

Accordingly, the present disclosure provides a magnetic material and an inductor capable of attaining both higher magnetic permeability and improved DC superposition characteristics.

In the composite magnetic material containing large particles and small particles made of a metal magnetic material, the present inventors have found that both higher magnetic permeability and improved DC superposition characteristics can be attained by controlling the particle diameter of the small particles and the thicknesses of the insulating films of the small particles and the large particles, to thereby complete the present disclosure.

According to a first overview of the present disclosure, there is provided a composite magnetic material comprising metal magnetic particles, in which the metal magnetic particles include first particles having a median diameter $D_{50}$ of 1.3 μm or more and 5.0 μm or less (i.e., from 1.3 μm to 5.0 μm), and second particles having a median diameter $D_{50}$ larger than the first particles. The first particles and the second particles each include a core portion made of a metal magnetic material, and an insulating film provided on a surface of the core portion. The insulating film of the second particles has an average thickness of 40 nm or more and 100 nm or less (i.e., from 40 nm to 100 nm). An average thickness of the insulating film of the first particles is smaller than that of the insulating film of the second particles.

According to a second overview of the present disclosure, there is provided an inductor using the above-described composite magnetic material.

The composite magnetic material and the inductor according to the present disclosure have the above features, and hence can attain both higher magnetic permeability and improved DC superposition characteristics.

DETAILED DESCRIPTION

Figure 1:
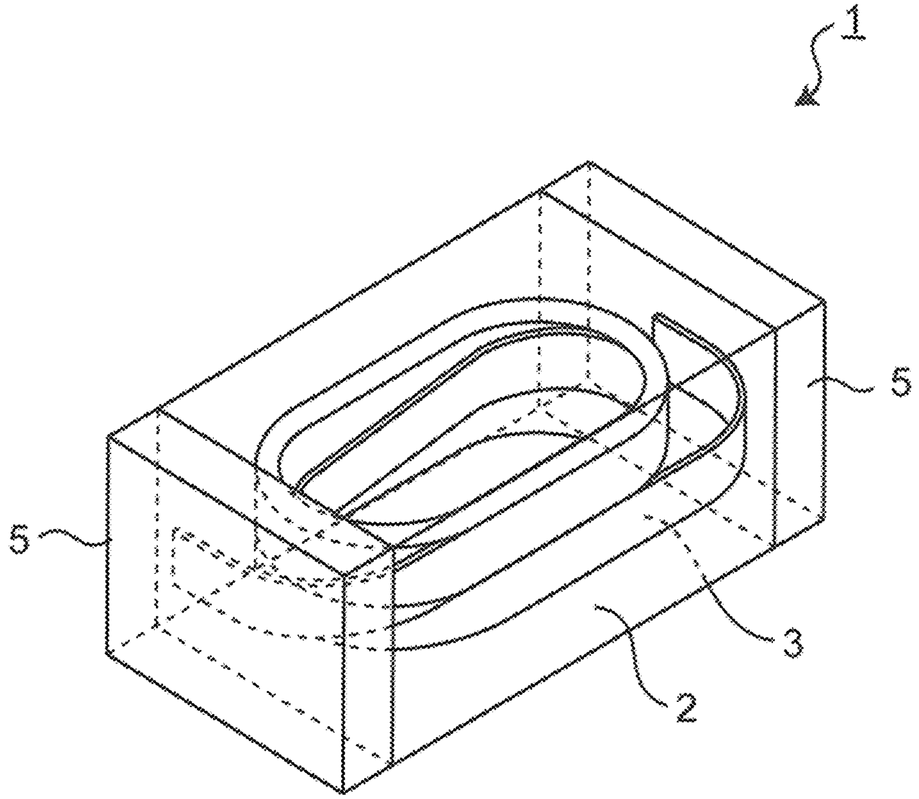
FIG. 1 is a configuration example of an inductor according to one embodiment of the present disclosure.

Hereinafter, an embodiment of the present disclosure will be described in detail with reference to the drawings. However, the embodiment described below is for the purpose of illustration, and the present disclosure is not limited to the following embodiments.

[Composite Magnetic Material]

A composite magnetic material according to one embodiment of the present disclosure contains metal magnetic particles. The metal magnetic particles include first particles having a median diameter $D_{50}$ of 1.3 μm or more and 5.0 μm or less (i.e., from 1.3 μm to 5.0 μm), and second particles having a median diameter $D_{50}$ larger than the first particles. In the present specification, "median diameter $D_{50}$" means a volume-based median diameter, and "median diameter $D_{50}$ of the first particle" and "median diameter $D_{50}$ of the second particle" are respectively values including the thicknesses of insulating films existing on surfaces of the first particles and the second particles. The second particles each have an insulating film having an average thickness of 40 nm or more and 100 nm or less (i.e., from 40 nm to 100 nm). The first particles each have an insulating film having an average thickness smaller than that of the second particles. In this specification, the "average thickness" of the insulating film means, in a broad sense, an average value of the thicknesses of the insulating film measured at a plurality of points in the cross section of the metal magnetic particle (first particle or second particle), and in a narrow sense, a value derived by the procedure described below. Using STEM/EDX, the cross section of the metal magnetic particle (first particle or second particle) is photographed for three fields per particle, and for each EDX image, the thickness of the insulating film is measured at arbitrarily set four points at equal intervals. The above-mentioned measurement is performed on three particles, and the average value obtained from the thicknesses of the insulating films measured at all points (3 fields×4 points×3=36 points) is defined as "average thickness". Details of the method for analyzing the thickness of the insulating film will be described later. By setting the particle diameter of the metal magnetic particles and the thickness of the coating films as described above, the composite magnetic material according to the present embodiment can attain both higher magnetic permeability and improved DC superposition characteristics as will be described in detail below.

The metal magnetic particles include first particles (small particles) and second particles (large particles) having a median diameter $D_{50}$ larger than that of the first particles. Since the composite magnetic material according to the present embodiment includes small particles and large particles, the density and filling rate of the metal magnetic particles are increased, and the magnetic permeability can be improved. The first particles (small particles) also have a function of separating the second particles (large particles) from each other as will be described later.

The first particles and the second particles each include a core portion made of a metal magnetic material and an insulating film provided on the surface of the core portion. The presence of the insulating films on the surfaces of the first particles and the second particles can prevent the core portions from coming into direct contact with each other, and as a result, the insulating properties of the composite magnetic material can be increased. In the present specification, whether or not the coating film has "insulating properties" can be determined based on the volume resistivity. For example, when the volume resistivity measured at a load of 20 kN using a high resistance resistivity meter (Hiresta (registered trademark)-UX MCP-HT800) manufactured by Mitsubishi Chemical Analytech Co., Ltd. as a powder resistance measuring instrument is $10^6$ Ωcm or more with a sample amount of metal magnetic particles having an insulating film being 10 g, it can be determined that the coating film has "insulating properties".

The insulating film of the second particles has an average thickness of 40 nm or more and 100 nm or less (i.e., from 40 nm to 100 nm). By setting the thickness of the insulating film existing on the surface of the second particle in this way, it is possible to attain both improved DC superposition characteristics and higher magnetic permeability. The reason why both improved DC superposition characteristics and higher magnetic permeability can be attained by controlling the thickness of the insulating film of the second particles is not limited by a specific theory, but is presumably due to the mechanism described below. By providing insulating film on the second particles, the core portions (portions made of a metal magnetic material) constituting the second particles can be spaced apart. When the thicknesses of the insulating film of the second particles is 40 nm or more, the core portions are separated from each other, so that the concentration of magnetic flux generated between the second particles when an external magnetic field is applied is relaxed, and the magnetic flux density in the second particles is reduced. As a result, magnetic saturation in the second particles can be suppressed, and the DC superposition characteristics can be improved. Further, when the thickness of the insulating film of the second particles is 100 nm or less, the density of the magnetic body in the composite magnetic material can be increased, so that higher magnetic permeability and higher inductance (L value) can be attained.

The median diameter $D_{50}$ of the first particles is 1.3 μm or more and 5.0 μm or less (i.e., from 1.3 μm to 5.0 μm). By setting the median diameter $D_{50}$ of the first particles in this way, it is possible to attain both improved DC superposition characteristics and higher magnetic permeability. The reason why both improved DC superposition characteristics and higher magnetic permeability can be attained by controlling the median diameter $D_{50}$ of the first particles is not limited by a specific theory, but is presumably due to the mechanism described below. When the median diameter $D_{50}$ of the first particles is 1.3 μm or more, the second particles can be separated from each other. As a result, it is possible to suppress the concentration of magnetic flux in the composite magnetic material when an external magnetic field is applied, and the magnetic flux density in the second particles is reduced. Since the second particles have a larger particle diameter than the first particles, the contribution to the magnetic properties of the composite magnetic material is large. Therefore, by separating the second particles from each other, the magnetic saturation of the entire composite magnetic material is relaxed, and the DC superposition characteristics can be further improved. In addition, when the median diameter $D_{50}$ of the first particles is 1.3 μm or more, an increase in magnetization of the magnetic material with respect to the magnetic field can be suppressed, and thus magnetic saturation when a low magnetic field is applied can be suppressed. On the other hand, when the median diameter $D_{50}$ of the first particles is 5.0 μm or less, the metal magnetic particles can be filled with a high density when a molded body is formed with the composite magnetic material, and the density of the metal magnetic particles is increased, with the result that the magnetic permeability is improved.

The first particles each have an insulating film having an average thickness smaller than that of the second particles. The presence of the insulating film on the surfaces of the first particles can prevent the core portions of the first particles from coming into direct contact with each other. When the core portions are in direct contact with each other, the magnetic flux tends to concentrate at the contact portion. By separating the core portions of the first particles from each other, the concentration of magnetic flux is alleviated, so that magnetic saturation in the first particles can be suppressed, with the result that the DC superposition characteristics can be improved. Further, when the average thickness of the insulating film of the first particles is smaller than the average thickness of the insulating film of the second particles, the density of the magnetic body in the composite magnetic material is increased, and higher magnetic permeability can be attained.

The insulating film of the first particles has an average thickness of preferably 10 nm or less, more preferably 3 nm or more and 10 nm or less (i.e., from 3 nm to 10 nm). When the average thickness of the insulating film of the first particles is 10 nm or less, more preferably 3 nm or more and 10 nm or less (i.e., from 3 nm to 10 nm), the magnetic permeability and DC superposition characteristics can be further improved.

As described above, in the composite magnetic material according to the present embodiment, both the median diameters $D_{50}$ and the insulating film thicknesses of the first particles and the second particles are controlled, so that both higher magnetic permeability and improved DC superposition characteristics can be attained.

The magnetic permeability of the composite magnetic material can be measured using an impedance analyzer. The evaluation of the DC superposition characteristics of the composite magnetic material can be performed by the procedure described below using an LCR meter. First, a ring-shaped molded body made of a composite magnetic material is produced, and this molded body is wound with a copper wire. A direct current (for example, a direct current of 0 to 30 A) is applied to the copper wire to acquire an inductance (L value). The magnetic permeability (μ value) is calculated from the L value, and the current value ($L_{sat}$) when the current value is reduced from the μ value at which the current is zero to the μ value of 80% is obtained. The magnetic field ($H_{sat}$) at which the μ value is 80% is calculated from $I_{sat}$, the dimensions of the molded body, and the number of turns of copper wire. The value of $H_{sat}$ is an index for evaluating the DC superposition characteristics. As the value of $H_{sat}$ is increased, the DC superposition characteristics are improved.

The volume ratio between the first particles and the second particles can be adjusted according to desired magnetic permeability and DC superposition characteristics. Preferably, the volume ratio between the first particles and the second particles is in the range between 6:34 and 6:9. When the volume ratio of the first particles to the second particles is 6/34=0.18 or more, the filling rate of the metal magnetic particles is increased. On the other hand, when the volume ratio of the first particles to the second particles is 6/9=0.67 or less, the amount of the second particles having a large contribution to the magnetic permeability of the composite magnetic material is increased. Therefore, the magnetic permeability of the composite magnetic material can be further increased by setting the volume ratio of the first particles to the second particles within the above range.

The median diameter $D_{50}$ of the second particles is preferably 3.8 times or more and 40 times or less (i.e., from 3.8 times to 40 times) of the median diameter $D_{50}$ of the first particles. When the median diameter $D_{50}$ of the second particles is 3.8 times or more of the median diameter $D_{50}$ of the first particles, the filling rate of the metal magnetic particles is further increased by the first particles entering the voids existing between the second particles. As a result, the magnetic permeability of the composite magnetic material can be further increased. When the median diameter $D_{50}$ of the second particles is 40 times or less than the median diameter $D_{50}$ of the first particles, in an electronic component manufactured using the composite magnetic material, the insulation of the element body composed of the composite magnetic material can be improved. In particular, high insulation can be attained when the electronic component is downsized. When the electronic component is downsized, if the median diameter $D_{50}$ of the second particles existing in the element body is too large, there is a risk that only one second particle is arranged between the internal electrode and the surface of the electronic component or between the internal electrode and the external electrode. In this case, as compared to the case where a plurality of particles are arranged between the internal electrode and the surface of the electronic component or between the internal electrode and the external electrode, the number of interfaces formed by contacting the particle surfaces is reduced. Since the interface between the particle surfaces has a function of exhibiting insulating properties, if the number of interfaces is reduced, there is a risk that the insulating properties of the element body cannot be maintained. By setting the median diameter $D_{50}$ of the second particles to 40 times or less of the median diameter $D_{50}$ of the first particles, the situation that only one second particle is arranged between the internal electrode and the surface of the electronic component or between the internal electrode and the external electrode can be prevented, and the insulation of the element body can be maintained.

Specifically, the median diameter $D_{50}$ of the second particles is preferably 20.0 μm or more and 30.0 μm or less (i.e., from 20.0 μm to 30.0 μm). When the median diameter $D_{50}$ of the second particles is 20.0 μm or more, the filling rate of the metal magnetic particles is further increased by the first particles entering the voids existing between the second particles. As a result, the magnetic permeability of the composite magnetic material can be further increased. When the median diameter $D_{50}$ of the second particles is 30.0 μm or less, the situation that only one second particle is arranged between the internal electrode and the surface of the electronic component or between the internal electrode and the external electrode can be prevented. As a result, in an electronic component manufactured using the composite magnetic material, the insulation of the element body composed of the composite magnetic material can be improved. In particular, high insulation can be attained when the electronic component is downsized.

The type of metal magnetic materials constituting the core portions of the first particles and the second particles is not particularly limited, and can be selected suitably according to the desired properties and applications, the composition of the insulating film formed on the surface, and the formation method of the insulating film. The metal magnetic material may be any of a crystalline material, an amorphous material, or a mixed material (including a nanocrystalline material) in which a crystalline phase (including a nanocrystalline phase) and an amorphous phase are mixed. The first particles and the second particles may be made of the same type of material, or may be made of different types of materials. The core portions of the first particles and the second particles may contain a small amount of impurities in addition to the metal magnetic material, but preferably the core portions of the first particles and the second particles are made of only the metal magnetic material.

The metal magnetic material constituting the core portions of the first particle and the second particle may be, for example: FeSi alloy, FeSiCr alloy, FeSiAl alloy, FeSiBCuNb alloy, FeSiCrNbBPCu alloy, FeCo alloy, FeCoV alloy, or FeNi alloy; alloy containing at least one selected from the group consisting of Fe, Nb, Hf, Zr, Ta, Ti, Mo, W, and V, and B, Si, and Cd and may further contain at least one of Co and Ni and/or at least one selected from the group consisting of Al, Mn, Ag, Zn, Sn, As, Sb, Bi, N, O, and rare earth elements; alloy containing Fe, B, P and Cu and may further contain Si and/or C; alloy containing at least one selected from the group consisting of Fe, Cu, Si, B, Nb, W, Ta, Zr, Hf, and Mo and may further contain at least one selected from the group consisting of V, Cr, Mn, platinum group elements, Sc, Y, Au, Zn, Sn, and Re, and/or at least one selected from the group consisting of C, P, Ge, Ga, Sb, In, Be, and As; and Fe amorphous alloys such as FeSiCrBC amorphous alloys and FeSiCrNbBPCu amorphous alloys. However, the metal magnetic material is not limited to the materials described above.

The core portion of the first particle is preferably composed of at least one alloy selected from the group consisting of FeSi alloy, FeSiCr alloy, FeSiAl alloy, FeCo alloy, and Fe amorphous alloy, or Fe (carbonyl iron powder, etc.). The core portion of the first particle may be a crystalline material containing at least one alloy selected from the group consisting of FeSi alloy, FeSiCr alloy, FeSiAl alloy, and FeCo alloy, or Fe (carbonyl iron powder, etc.). The core portion of the second particle is preferably composed of at least one alloy selected from the group consisting of FeSi alloy, FeSiCr alloy, FeSiAl alloy, FeCo alloy, FeNi alloy, and Fe amorphous alloy. The core portion of the second particle may be a crystalline material containing at least one alloy selected from the group consisting of FeSi alloy, FeSiCr alloy, FeSiAl alloy, FeCo alloy, and FeNi alloy.

The type of the insulating materials constituting the insulating films of the first particle and the second particle is not particularly limited, and can be selected suitably according to the desired properties and applications, the compositions of the core portions, the formation method of the insulating films, and the heating temperature during molding (resin curing temperature or firing temperature). The insulating film of the first particles and the insulating film of the second particles may be made of the same type of material, or may be made of different types of materials. The insulating film of the first particles and the insulating film of the second particles may contain a small amount of impurities in addition to the insulating material, but preferably the insulating film of the first particles and the insulating film of the second particles may only contain the insulating material.

The insulating film of the first particles preferably has a composition different from that of the insulating film of the second particles. If the composition of the insulating film of the first particles is different from the composition of the insulating film of the second particles, the surface potential of the first particles and the surface potential of the second particles are different, so that the first particles and the second particles can be uniformly dispersed without agglomeration. As a result, the first particles (small particles) can be uniformly arranged between the second particles (large particles), with the result that the DC superposition characteristics are further improved and the magnetic permeability is further increased. Specifically, one of the insulating film of the first particles and the insulating film of the second particles may contain Si (silicon), and the other may not contain Si. At this time, the insulating film not containing Si may contain, for example, P (phosphorus). Thus, by setting the compositions of the insulating films of the first particles and the second particles, the DC superposition characteristics can be further improved and the magnetic permeability can be further increased.

At least one of the insulating film of the first particles and the insulating film of the second particles is preferably nonmagnetic. When the insulating film is nonmagnetic, the concentration of magnetic flux between the second particles can be more effectively mitigated, and magnetic saturation can be more effectively suppressed. As a result, the DC superposition characteristics can be further improved. More preferably, both the insulating film of the first particles and the insulating film of the second particles are nonmagnetic. When both the insulating film of the first particles and the insulating film of the second particles are made of a nonmagnetic material, the DC superposition characteristics can be further improved.

Examples of the insulating materials constituting the insulating films of the first particle and the second particle include silica, phosphate glass, and resin films such as a silicone resin film, a phenol resin film, an epoxy resin film, a polyamide resin film, and a polyimide resin film. However, the material constituting the insulating films is not limited to those described above. In the case of using phosphate glass as the insulating film, phosphate compounds that represent phosphate glass include calcium phosphate, potassium phosphate, ammonium phosphate, sodium phosphate, magnesium phosphate, aluminum phosphate, and phosphates such as phosphite and hypophosphite, and among these, calcium phosphate is preferably used.

The composite magnetic material according to present embodiment preferably further contains a resin. When the composite magnetic material contains a resin in addition to the metal magnetic particles, a molded body made of the composite magnetic material can be manufactured by curing the resin. The molded body made of the composite magnetic material can be manufactured by firing as described later, but is preferably manufactured by curing the resin. Since the curing temperature of the resin tends to be lower than the sintering temperature of the metal magnetic particles, a molded body can be manufactured at a relatively low temperature by using the resin. Therefore, it is easy to set the heating temperature at the time of molding to a temperature sufficiently lower than the melting point of the insulating film, and it is easy to prevent the insulating film from being damaged by heating. In addition, the use of a resin has an advantage that an additive necessary for sintering becomes unnecessary. The type of the resin is not particularly limited, and can be appropriately selected according to the desired characteristics and applications. The resin may be, for example, an epoxy resin, a silicone resin, a phenol resin, a polyamide resin, a polyimide resin, a polyphenylene sulfide resin, or the like, but is not limited to the above materials. The content of the resin is preferably 1.5% by weight or more and 5.0% by weight or less (i.e., from 1.5% by weight to 5.0% by weight), more preferably 2.0% by weight or more and 5.0% by weight or less (i.e., from 2.0% by weight to 5.0% by weight), based on the weight of the entire composite magnetic material. When the content of the resin is 1.5% by weight or more, voids in the molded body can be reduced, and the strength and weather resistance of the molded body can be improved. This effect is particularly remarkable when a molded body is manufactured by heat molding. When the content of the resin is 5.0% by weight or less, segregation of the resin in the molded body can be suppressed, and the occurrence of burrs due to the resin seeping out from the molding die can be suppressed. As a result, a more suitable molded body can be obtained.

The composite magnetic material according to the present embodiment may contain one or more types of metal magnetic particles having a median diameter $D_{50}$ different from those of the first particles and the second particles in addition to the first particles, the second particles, and optionally the resin. However, the composite magnetic material preferably contains only the first particles and the second particles as the metal magnetic particles. When the composite magnetic material contains a resin, the composite magnetic material may contain only the first particles, the second particles, and the resin. The composite magnetic material may further contain an additive such as a lubricant. By adding the lubricant, it is easy to release from the die during molding, and productivity can be improved. Examples of the lubricant that can be used include metal soaps such as zinc stearate, calcium stearate, and lithium stearate, long chain hydrocarbons such as wax, and silicone oil.

[Method for Manufacturing Composite Magnetic Material]

Next, the method for manufacturing the composite magnetic material according to present embodiment will be described. However, the method described below is only an example, and the method for manufacturing the composite magnetic material according to the present embodiment is not limited to the following method.

First, particles of metal magnetic materials to be core portions of the first particles and the second particles are prepared. The composition of the core portion is as described above. Next, an insulating film is formed on each of the surface of the core portion of the first particle and the surface of the core portion of the second particle. The composition of the insulating film is as described above. The method for forming the insulating film is not particularly limited, and can be appropriately selected according to the composition and particle diameter of the core portion, the composition and thickness of the insulating film to be formed, and the like. The insulating film may be formed by, for example, a mechanochemical method or a sol-gel method. Among these, the mechanochemical method is low in cost and is a particularly suitable method for forming an insulating film having a relatively large thickness on the surface of a core portion having a relatively large particle diameter. In the case of forming an insulating film using the mechanochemical method, the thickness of the insulating film can be controlled by controlling the addition amount of the insulating material. The sol-gel method can be applied to a core portion having a wide range of compositions and sizes, can form an insulating film having a relatively small thickness, and can form an insulating film having a relatively high melting point. When the insulating film is formed using the sol-gel method, the thickness of the insulating film can be controlled by adjusting, for example, the time of the sol-gel reaction, the addition amount of the metal alkoxide and the solvent, and the like. Thus, the first particles and the second particles can be obtained by forming the insulating film on the surface of the core portion.

The obtained first particles and second particles are weighed and mixed so as to have a predetermined volume ratio to obtain metal magnetic particles. A resin material is added to the metal magnetic particles at a predetermined ratio and mixed to obtain a slurry. The composition of the resin is as described above. As the resin material, for example, an epoxy resin as a resin solid content and a varnish containing acetone or a glycol solvent as a solvent can be used. In the composite magnetic material according to present embodiment, the resin is not an essential component.

The obtained slurry is formed into a sheet. The molding method is not particularly limited, and a well-known method is employable suitably. For example, a sheet can be formed by applying a slurry on a base material such as a PET film so that the sheet thickness becomes a predetermined thickness by a doctor blade method. In order to facilitate peeling of the sheet from the base material, the sheet is dried to evaporate the solvent. The drying temperature and time can be appropriately set according to the type and content of the solvent. After drying, the sheet is peeled off from the base material.

After processing the sheet peeled off from the base material into a predetermined shape, a plurality of sheets are laminated, and pressurized and heated, whereby a molded body of a composite magnetic material can be obtained. As an example, when a ring-shaped molded body is formed, molding is performed in such a manner that the sheet peeled off from the base material is processed into a ring shape of a predetermined size, and a plurality of ring-shaped sheets are laminated in a ring-shaped die. Molding with a die may be performed, for example, by pressurizing the die for 10 minutes under the conditions of 80° C. and 7 MPa, and then pressurizing the die for 30 minutes under the conditions of 170° C. and 4.3 MPa. In this way, a ring-shaped molded body of a composite magnetic material can be obtained.

In addition, in the manufacturing method mentioned above, although the molded body is manufactured by heating and curing a resin, it is also possible to manufacture a molded body by firing. In this case, no resin is required. When a molded body is manufactured by firing, a binder such as PVA (polyvinyl alcohol) is added to and mixed with metal magnetic particles to obtain a metal magnetic material paste. The metal magnetic material paste is molded by a doctor blade method or the like, and the obtained molded body is fired at a predetermined temperature, whereby a molded body made of a composite magnetic material can be obtained. The firing temperature is set to a temperature that is lower than the melting point of the insulating film and allows proceeding of the sintering of the metal magnetic particles. When a molded body is manufactured by firing, the insulating films of the first particles and the second particles are preferably a high melting point material such as silica.

[Analysis Method of Average Thickness of Insulating Films]

The average thickness of the insulating films of the first particles and the second particles can be determined by the procedure described below. The average thickness of the insulating films can be measured using STEM/EDX (scanning transmission electron microscope/energy dispersive X-ray analysis). First, the particles to be measured are filled with a resin and polished, and a sample for STEM/EDX observation is produced by FIB (focused ion beam) processing. By STEM/EDX, an EDX image of the element contained in the insulating film is obtained at a magnification of 400k. EDX images are photographed for three fields per particle, and for each EDX image, the thickness of the insulating film is measured at set four points at equal intervals of 30 nm on the surface of the core portion. The above-mentioned measurement is performed on three particles, and the average value calculated from the thicknesses of the insulating films measured at all points (3 fields×4 points×3=36 points) is defined as the average thickness of the insulating film. The thicknesses of the insulating films of the first particles and the second particles can also be obtained by performing analysis by STEM/EDX in the same manner as the above method on the cross section of the molded body composed of the composite magnetic material. The thickness of the insulating film can be considered to be substantially the same value before and after molding.

[Analysis Method of Volume Ratio Between First Particles and Second Particles and Median Diameters $D_{50}$]

The volume ratio between the first particles and the second particles contained in the composite magnetic material according to the present embodiment, and the median diameters $D_{50}$ of the second particles and the first particles can be obtained by analyzing SEM (scanning electron microscope) images obtained by photographing a cross section of the molded body made of the composite magnetic material.

First, a cross section of the molded body is cut out with a wire saw or the like and separated into pieces. After the cross section is processed to be flat using a milling apparatus or the like, reflected electron images are acquired for five fields for each of a 300-magnification image and a 1000-magnification image by SEM. The reason for acquiring both the 300-magnification image (low magnification image) and the 1000-magnification image (high magnification image) is to analyze both the particle diameters of the first particles (small particles) and the particle diameters of the second particles (large particles) with high accuracy. Next, using the image analysis software, the acquired SEM image is binarized to obtain the equivalent circle diameter of the particle cross section. The frequency is counted for the equivalent circle diameter obtained by image analysis, and a histogram is obtained. There is a frequency difference derived from the difference in magnification between the 300-magnification image and the 1000-magnification image. In order to align the frequency in the 1000-magnification image with the frequency in the 300-magnification image, the frequency in the 1000-magnification image is multiplied by the square of (1000/300). Furthermore, the value of the particle diameter at which the variation of the histogram of the 1000-magnification image is larger than the variation of the histogram of the 300-magnification image is obtained, and the value of the 300-magnification image is adopted as the frequency of the particle diameter larger than this particle diameter, and the value of the 1000-magnification image is adopted as the frequency of the particle diameter smaller than this particle diameter, to thereby form one histogram.

In order to make the histogram frequency a volume-based distribution, based on the quantitative microscopy, calculation of multiplying the frequency by the volume calculated from the particle diameter interval and dividing it by the particle diameter is performed (reference: "Quantitative microscopy" written by R. T. DeHoff, F. N. Rhines, translated by Kunio Makishima, Yasutada Shinohara, and Takashi Komori, Uchida Rokakuho Publishing Co. Ltd., 1972, pp. 167-203). The above calculations are based on the quantitative microscopy that appears to be more frequent with particles of smaller cross-sectional area. Here, normalization is performed by dividing the frequency of each section by the total frequency so that the total frequency becomes 1.

By fitting the volume-based histogram thus obtained with the sum of two lognormal distributions (the sum of the lognormal distribution of the first particles and the lognormal distribution of the second particles), the median diameters $D_{50}$ of the first particles and the second particles and the volume ratio (blending ratio) between the first particles and the second particles are calculated. The probability density function of the lognormal distribution is given by the following equation.

$$f(x) = \begin{cases} \frac{1}{\sqrt{2\pi}\,\sigma x}\exp\left\{\frac{-(\log x - \mu)^2}{2\sigma^2}\right\}, & x > 0 \\ 0, & x \le 0 \end{cases} \quad \text{[Equation 1]}$$

In the above equation, the variable x corresponds to the data interval, σ corresponds to the variance, and μ corresponds to the average. Since this probability density function is expressed for each of the first particle and the second particle, the variables are x1, x2, σ1, σ2, μ1, and μ2, respectively. Note that 1 at the end of each variable means the first particle, and 2 means the second particle. Furthermore, in order to express the probability density function of the first particle and the probability density function of the second particle as one probability density function, each probability density function is multiplied by a predetermined ratio (p1, p2) and summed. The probability density function obtained by combining the first particle and the second particle thus obtained is normalized so that it can be fitted to a volume-based histogram.

Of the variables of the probability density function, the data intervals x1 and x2 are given by the data interval of the volume-based histogram. Therefore, in order to fit a volume-based histogram using the synthesized probability density function, optimization is performed with least squares method using the variances σ1 and σ2, the averages μ1 and μ2, and the proportions p1 and p2 as variables to minimize the difference therebetween. From the probability density function of each of the first particle and the second particle given by the variable thus optimized, the normalized density function is accumulated to obtain a data interval value of 0.5, and median diameters $D_{50}$ of the first particles and the second particles. Further, a volume-based blending ratio (volume ratio) between the first particles and the second particles is obtained from the optimized ratio between p1 and p2.

The analysis method described above can be applied to also the case of obtaining the volume ratio between the first particles and the second particles and the median diameters $D_{50}$ of the first particles and the second particles from the chip cross section of a product such as a commercially available inductor.

[Inductor]

Next, an inductor according to one embodiment of the present disclosure will be described below. The inductor according to the present embodiment is an inductor using the composite magnetic material of the present disclosure. The inductor according to the present embodiment can attain both higher magnetic permeability and improved DC superposition characteristics. A configuration example of the inductor will be exemplified below, but the inductor according to the present embodiment is not limited to the following configuration example.

FIG. 1 shows a configuration example of the inductor according to the present embodiment. In the configuration shown in FIG. 1, an inductor 1 includes an element body 2 composed of a composite magnetic material, external electrodes 5 provided on the surface of the element body 2, and a coil conductor 3 provided inside the element body 2.

The inductor 1 shown in FIG. 1 can be manufactured, for example, by the method described below. First, a conductor is wound to form the coil conductor 3. The winding method may be any of a winding, uneven winding, edgewise winding, aligned winding, and the like.

Next, after the thermosetting composition is coated on the coil conductor 3, heat treatment is performed to form a covering body in which a film is formed on the surface of the coil conductor 3. Coating of thermosetting composition may be performed by dip coating or spray coating, for example, and may be performed combining these. By performing dip coating or spray coating, adjustment to the desired coating amount can be easily performed. Spray coating may be performed by a single spray, or may be performed in a plurality of sprays. Further, by heat-treating the coil conductor 3 on which the thermosetting composition is coated, at least a part of the thermosetting compound contained in the thermosetting composition undergoes a crosslinking reaction, for example, thereby forming a film. Here, the film formed by the heat treatment may partially include an uncured portion or may be entirely cured. The cured state of the film can be estimated by thermal analysis such as differential thermal analysis and thermogravimetric analysis.

Coating of the thermosetting composition and film formation by heat treatment may be performed a plurality of times as necessary. By performing the film formation a desired number of times, a film having a more uniform and desired thickness can be formed, and the withstand voltage characteristics can be further improved.

Drying treatment which removes at least part of the liquid medium contained in the thermosetting composition may be performed after coating of the thermosetting composition and before heat treatment. The drying treatment may be performed independently of the heat treatment or may be performed continuously. The drying treatment may be performed under normal pressure or reduced pressure, and heat may be applied. The treatment conditions such as the temperature and time of the drying treatment can be appropriately selected according to the composition of the thermosetting composition and the coating amount.

The coating amount of the thermosetting composition may be appropriately adjusted so that a cured product having a desired thickness is obtained. Further, the treatment conditions such as the temperature and time of the heat treatment can be appropriately selected according to the composition of the thermosetting composition and the coating amount. For example, when the conductor constituting the coil conductor 3 is coated with a thermoplastic resin, the temperature of the heat treatment can be 80° C. or more and 250° C. or less (i.e., from 80° C. to 250° C.).

Before the thermosetting composition is coated on the coil conductor 3, the surface of the coil conductor 3 may be washed with an organic solvent such as alcohol and acetone, and surface treatment may be performed using surface treatment agents such as a coupling agent and an adhesion accelerator or radicals such as an ultraviolet ray and enzyme plasma. Thereby, adhesion of the film to the coil conductor 3 is further improved, and better characteristics can be obtained.

Next, the obtained covering body is embedded in the element body 2 composed of a composite magnetic material and pressurized to obtain the element body 2 in which the coil conductor 3 is arranged. Conditions commonly used in the technical field can be applied as conditions for embedding the covering body in the element body 2 and pressurizing it.

The external electrodes 5 can be formed, for example, on the element body 2 after the covering body is embedded. In this case, for example, the external electrodes 5 can be provided by coating a conductive paste for the external electrode 5 on both ends of the element body 2 after the covering body is embedded, and then performing heat treatment. The external electrodes 5 can also be provided by coating the conductive paste for the external electrode 5 to both ends of the element body 2 after the covering body is embedded, and then performing baking treatment and plating the baked conductor. In this case, in order to prevent the plating solution from entering the voids that may exist in the element body 2, the voids that exist in the element body 2 may be impregnated with a resin in advance. In this way, the inductor 1 can be obtained.

Figure 2:
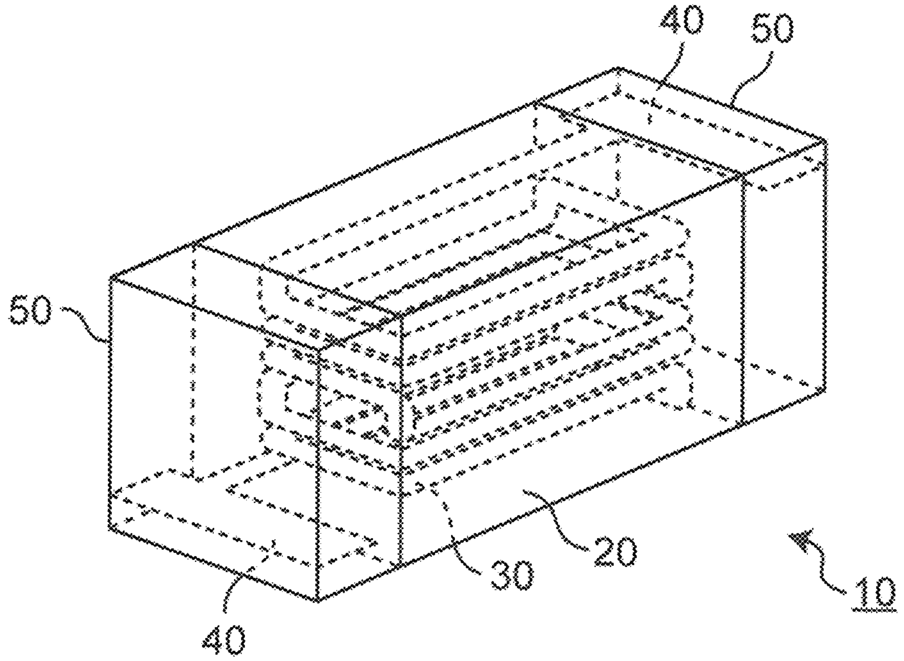
FIG. 2 is another configuration example of the inductor according to one embodiment of the present disclosure.

FIG. 2 shows another configuration example of the inductor according to the present embodiment. In the configuration shown in FIG. 2, an inductor 10 includes an element body 20 composed of a composite magnetic material, external electrodes 50 provided on the surface of the element body 20, a coil conductor 30 provided inside the element body 20, and lead conductors 40 that electrically connect the external electrodes 50 and the coil conductor 30.

The inductor 10 shown in FIG. 2 can be manufactured, for example, by the method described below. First, first particles and second particles are prepared. A binder such as PVA (polyvinyl alcohol) is added to the first particles and the second particles and kneaded to obtain a metal magnetic material paste. Further, a conductor paste for forming the coil conductor 30 is separately prepared. By applying the metal magnetic material paste and the conductor paste alternately in layers, a laminated molded body is obtained. The laminated molded body is debindered and heat-treated at a predetermined temperature in the atmosphere to obtain the element body 20. The external electrodes 50 can be formed, for example, on the element body 20 after heat treatment. In this case, for example, the external electrodes 50 can be provided by coating the conductive paste for the external electrode 50 to both ends of the element body 20 after heat treatment, and then performing heat treatment. The external electrodes 50 can also be provided by coating the conductive paste for the external electrode 50 to both ends of the element body 20 after heat treatment, and then performing baking treatment and plating the baked conductor. In this case, in order to prevent the plating solution from entering the voids that may exist in the element body 20, the voids that exist in the element body 20 may be impregnated with a resin in advance. In this way, the inductor 10 can be obtained.

Examples (Preparation of First Particle)

Carbonyl iron powder was used as the core portion of the first particle. By air classification, the particles were classified into particles having median diameters $D_{50}$ of 1.06 μm, 1.36 μm, 1.56 μm, 4.56 μm, 5.06 μm, and 5.6 μm, respectively. Each of the classified carbonyl iron powders was sol-gel treated to form insulating films of silica on the surfaces of the particles. In this way, first particles A1 to A6 having different particle diameters were obtained.

(Preparation of Second Particle)

As the core portion of the second particle, a FeSiCrBC amorphous particle having a median diameter $D_{50}$ of 26 μm was used. An insulating film of phosphate glass was formed on the surface of the amorphous particle by a mechanochemical method. By adjusting the addition amount of phosphate glass, the thickness of the insulating film was adjusted to obtain second particles B1 to B8 having different thicknesses of the insulating films of phosphate glass.

Figure 3:
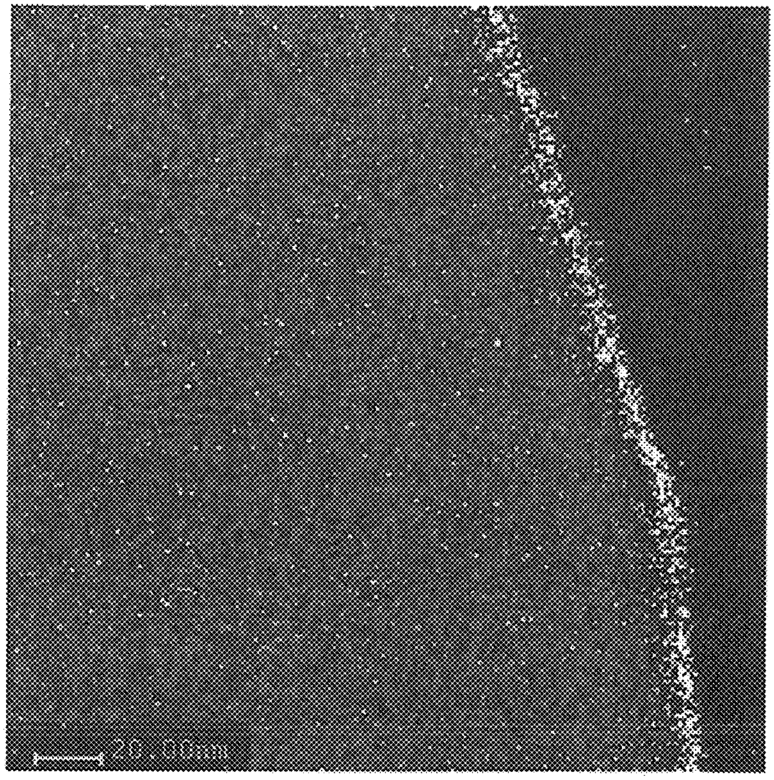
FIG. 3 is a STEM/EDX image of a first particle A4.
Figure 4:
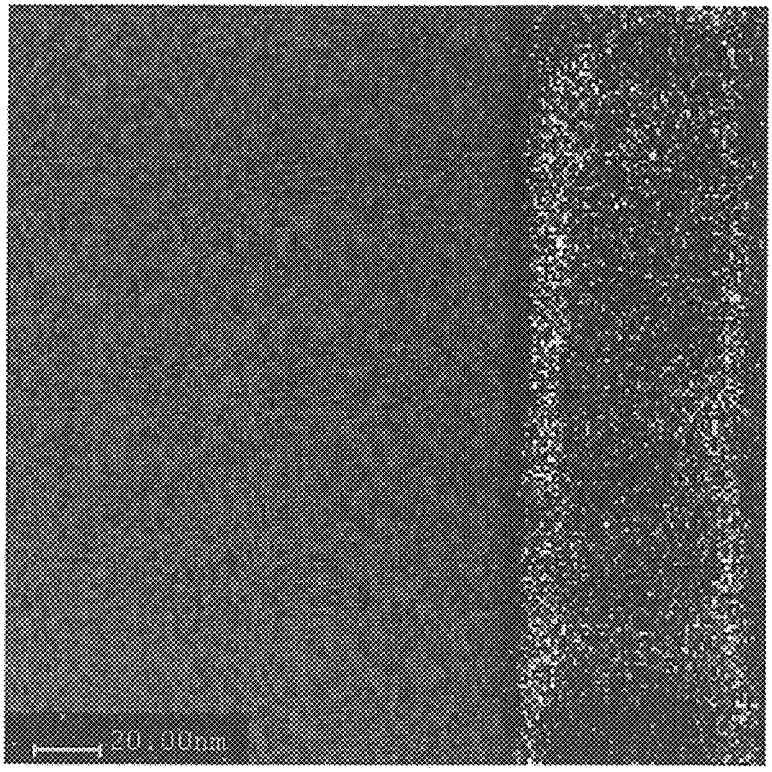
FIG. 4 is a STEM/EDX image of a second particle B5.

The average thickness of the insulating films was measured for each of the obtained first particles A1 to A6 and second particles B1 to B8. The average thickness of the insulating films was measured using STEM/EDX (HD-2300A manufactured by Hitachi High-Technologies Corporation/GENESIS XM4 manufactured by EDAX). First, the sample was filled with a resin and polished, and a sample for STEM/EDX observation was produced by FIB processing. By STEM/EDX, EDX images of a Fe (iron) element and a P (phosphorus) element or a Si (silicon) element were obtained at a magnification of 400k. FIGS. 3 and 4 show EDX images of the first particle A4 and the second particle B5 as examples. In measuring the average thickness of the insulating films on the first particles, EDX images are photographed for three fields per first particle, and for each EDX image, the thickness of the insulating film formed of the Si element was measured at set four points at equal intervals of 30 nm on the carbonyl iron powder surface. The above-mentioned measurement is performed on three first particles, and the average value calculated from the thicknesses of the insulating films measured at all points (3 fields×4 points×3=36 points) was defined as the average thickness of the insulating films of the first particles. In measuring the average thickness of the insulating films on the second particles, the thickness of the insulating film formed of the P element was measured on the amorphous particle surface by the same procedure as that for the first particles, and the average thickness was obtained. Table 1 shows the measurement results of the average thicknesses of the insulating films of the first particles A1 to A6 and the second particles B1 to B8.

TABLE 1

| Sample | Thickness of insulating film [nm] |
|---|---|
| A1 | 10 |
| A2 | 10 |
| A3 | 10 |
| A4 | 10 |
| A5 | 10 |
| A6 | 10 |
| B1 | 13 |
| B2 | 32 |
| B3 | 40 |
| B4 | 69 |
| B5 | 78 |
| B6 | 89 |
| B7 | 100 |
| B8 | 124 |

Experiment 1

Using the first particles A4 and the second particles B1 to B8 having different insulating film thicknesses, the molded bodies of Examples 1 to 5 and Comparative Examples 1 to 3 described below were produced, and the physical properties were evaluated.

(Blend)

The first particles and the second particles were weighed and mixed so that the volume ratio between the first particles and the second particles becomes 30:70 to obtain metal magnetic particles. The types of particles used in each example and comparative example are as shown in Table 3. An epoxy resin as a resin solid content and a varnish containing a glycol solvent as a solvent are used as a raw material for the resin. The varnish solid content in the varnish (resin solid content/(resin solid content+solvent)) was 50% by weight. The metal magnetic particles and varnish were weighed and mixed so that the slurry solid content (resin solid content/(metal magnetic particles+resin solid content+solvent)) becomes 4.0% by weight to obtain a slurry.

(Sheet Formation)

A sheet was formed by applying a slurry on a PET film so that the sheet thickness became 300 μm by a doctor blade method. The sheet was dried at 95° C. for 60 minutes to evaporate the solvent, and then the sheet was peeled off from the PET film.

(Ring Molding)

The sheet peeled off from the PET film was processed into a ring shape having an outer diameter of 13 mm and an inner diameter of 9 mm A plurality of ring-shaped sheets were laminated and molded in a die having an outer diameter of 13 mm and an inner diameter of 9 mm Molding with a die was performed by pressurizing the die for 10 minutes under the conditions of 80° C. and 7 MPa, and then pressurizing the die for 30 minutes under the conditions of 170° C. and 4.3 MPa. In this way, a ring-shaped molded body was obtained.

(Derivation of Volume Ratio Between First Particles and Second Particles and Median Diameters $D_{50}$)

The volume ratio between the first particles and the second particles contained in the magnetic material constituting the molded body, and the median diameters $D_{50}$ of the second particles and the first particles can be derived by analyzing SEM images obtained by photographing a cross section of the molded body. Details of the analysis method will be described below by taking analysis of a separately produced sample as an example.

As a sample for image analysis, the first particles A2 and the second particles B5 were blended at a volume ratio of 18:82, and a ring-shaped molded body was produced in the same procedure as in Examples 1 to 5 and Comparative Examples 1 to 3 described above.

Figure 5:
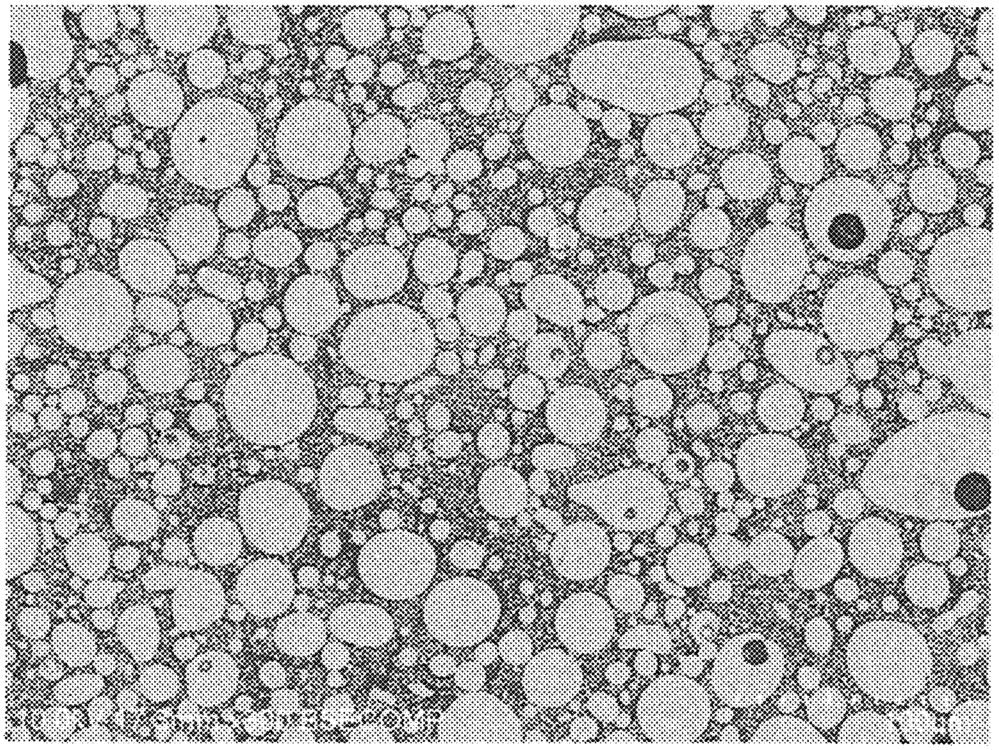
FIG. 5 is a 300-magnification reflected electron image of a cross-section of a molded body made of a composite magnetic material.
Figure 6:
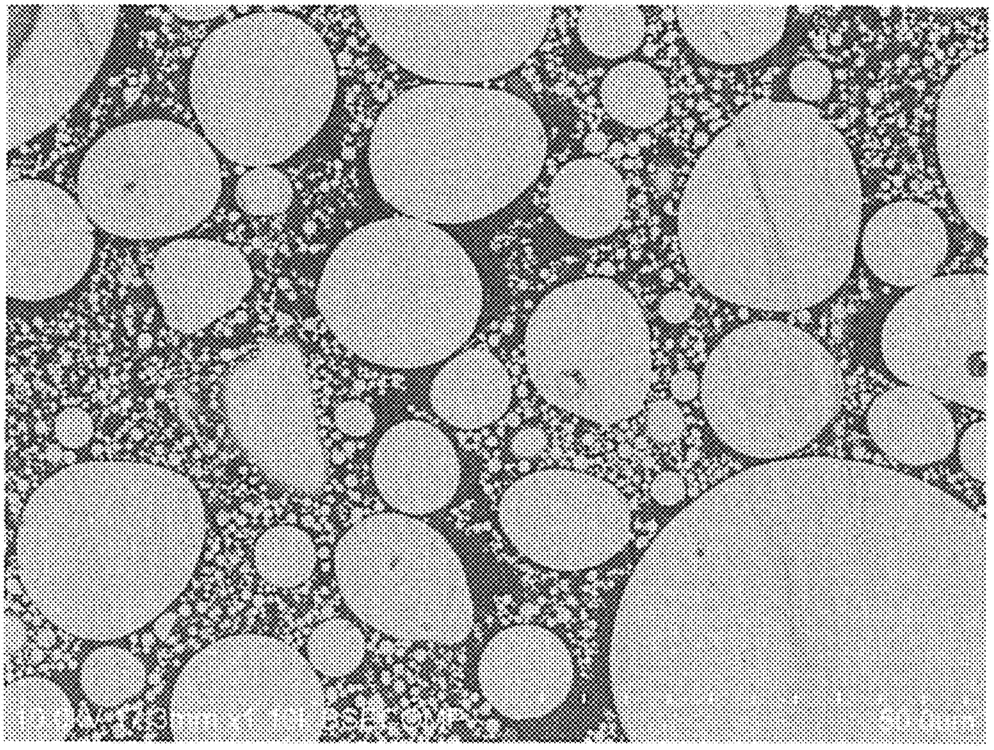
FIG. 6 is a 1000-magnification reflected electron image of the cross-section of the molded body made of the composite magnetic material.

Next, the cross section of the molded body was cut out with a wire saw and separated into pieces. After the cross-section is processed flatly using a milling device (IM4000 manufactured by Hitachi High-Technologies Corporation), and reflected electron images were acquired for five fields for each of a 300-magnification image and a 1000-magnification image by SEM (SU1510 manufactured by Hitachi High-Technologies Corporation). The reflected electron images of the 300-magnification image and the 1000-magnification image are shown in FIGS. 5 and 6, respectively. The reason for acquiring both the 300-magnification image (low magnification image) and the 1000-magnification image (high magnification image) was to analyze both the particle diameters of the second particles and the particle diameters of the first particles with high accuracy. When only the 300-magnification image is analyzed, many particle diameters of the second particles can be extracted, but it is difficult to quantify the particle diameters of the first particles with high accuracy. On the other hand, when only the 1000-magnification image is analyzed, the particle diameters of the first particles can be extracted with high accuracy, but the frequency of the second particles is low, so that it is difficult to quantify the particle diameters of the second particles with high accuracy.

Figure 7:
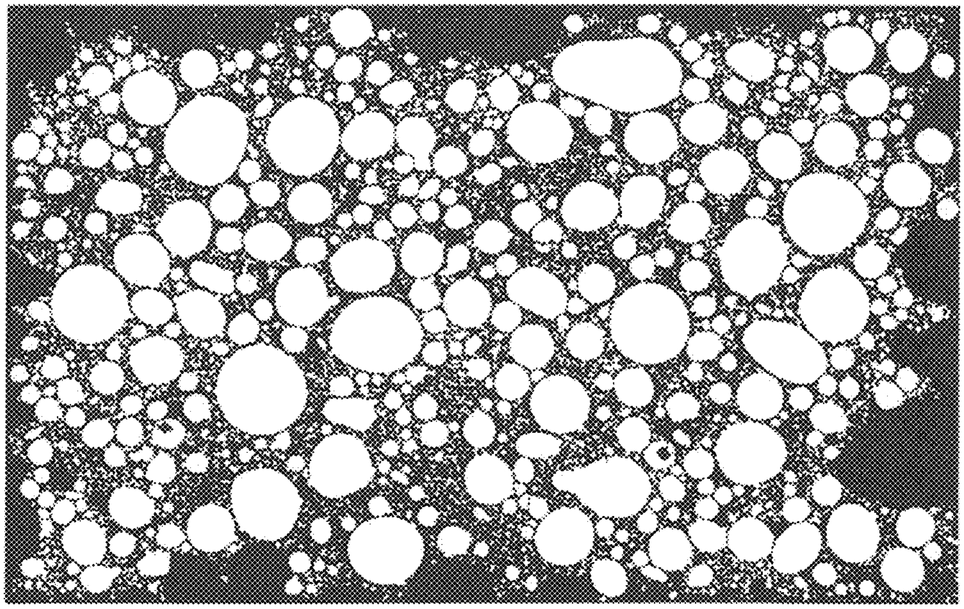
FIG. 7 is a binarized image of the reflected electron image shown in FIG. 5.
Figure 8:
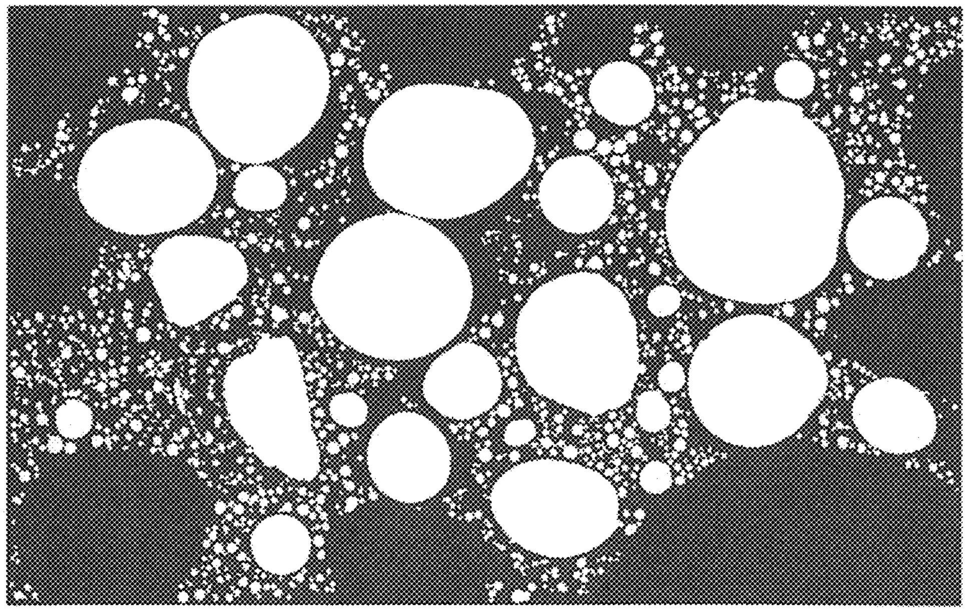
FIG. 8 is a binarized image of the reflected electron image shown in FIG. 6.

The acquired SEM image was binarized using image analysis software (A-zou kun (registered trademark), manufactured by Asahi Kasei Engineering Corporation), and the equivalent circle diameter of the particle cross section was obtained. The binarized images obtained by removing the area of the scale bar and binarizing the reflected electron images of FIGS. 5 and 6 by are shown in FIGS. 7 and 8, respectively.

Next, in order to obtain a histogram of the particle size distribution, data interval was defined as shown in Table 2 below. For the equivalent circle diameter obtained by image analysis, the frequency was counted in the range set in the interval shown in Table 2, and a histogram was obtained. The number of counts was 21263 in the 300-magnification image and 13600 in the 1000-magnification image.

TABLE 2

| Data interval [μm] |
|---|
| 0.1 |
| 0.3 |
| 0.4 |
| 0.6 |
| 0.8 |
| 0.9 |
| 1.1 |
| 1.3 |
| 1.4 |
| 1.6 |
| 1.8 |
| 1.9 |
| 2.1 |
| 2.3 |
| 2.5 |

TABLE 2-continued

| Data interval [μm] |
|---|
| 2.8 |
| 3.0 |
| 3.3 |
| 3.6 |
| 3.9 |
| 4.3 |
| 4.6 |
| 5.0 |
| 5.5 |
| 6.0 |
| 6.8 |
| 7.1 |
| 7.8 |
| 8.8 |
| 9.3 |
| 10.1 |
| 11.0 |
| 12.0 |
| 13.1 |
| 14.3 |
| 15.6 |
| 17.0 |
| 18.5 |
| 20.2 |
| 22.0 |
| 24.0 |
| 26.2 |
| 28.5 |
| 31.1 |
| 33.8 |
| 37.0 |
| 40.4 |
| 44.0 |
| 48.0 |
| 52.3 |
| 57.1 |
| 61.5 |
| 66.1 |

There is a frequency difference derived from the difference in magnification between the 300-magnification image and the 1000-magnification image. In order to align the frequency in the 1000-magnification image with the frequency in the 300-magnification image, the frequency in the 1000-magnification image was multiplied by the square of (1000/300). When a histogram was created, the value of 300-magnification image was adopted for the frequency of particle diameters of 20.2 μm or more, and the value of 1000-magnification image was adopted for the frequency of particle diameters smaller than 20.2 μm to form one histogram. The reason why the boundary is set to the particle diameter of 20.2 μm is that the variation in the histogram of the 1000-magnification image is larger than the variation in the histogram of the 300-magnification image when the particle diameter is 20.2 μm or more.

In order to make the frequency of the histogram a volume-based distribution, the calculation was performed by multiplying the frequency by the volume calculated from the particle diameter interval and dividing it by the particle diameter based on the quantitative microscopy. Here, normalization was performed by dividing the frequency of each section by the total frequency so that the total frequency became 1.

By fitting the volume-based histogram thus obtained with the sum of two lognormal distributions (the sum of the lognormal distribution of the first particles and the lognormal distribution of the second particles), the median diameters $D_{50}$ of the first particles and the second particles and the volume ratio (blending ratio) between the first particles and the second particles were calculated. The probability density function of the lognormal distribution is given by the following equation.

$$f(x) = \begin{cases} \frac{1}{\sqrt{2\pi}\sigma x}\exp\left\{\frac{-(\log x - \mu)^2}{2\sigma^2}\right\}, & x > 0 \\ 0, & x \le 0 \end{cases} \quad \text{[Equation 2]}$$

In the above equation, the variable x corresponds to the data interval, σ corresponds to the variance, and μ corresponds to the average. Since this probability density function is expressed for each of the first particle and the second particle, the variables are x1, x2, σ1, σ2, μ1, and μ2, respectively. Note that 1 at the end of each variable means the first particle, and 2 means the second particle. Furthermore, in order to express the probability density function of the first particle and the probability density function of the second particle as one probability density function, each probability density function was multiplied by a predetermined ratio (p1, p2) and summed. The probability density function obtained by combining the first particle and the second particle thus obtained was normalized so that it could be fitted to a volume-based histogram.

Figure 9:
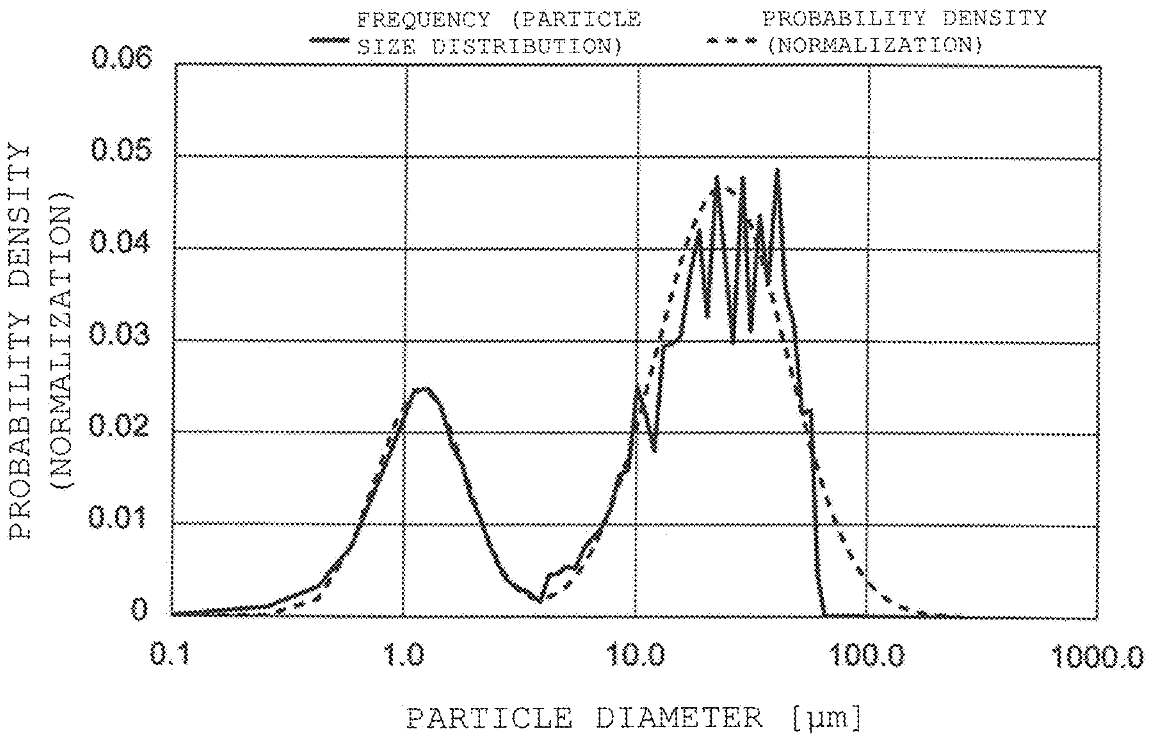
FIG. 9 is a fitting result of a particle size distribution and a lognormal distribution obtained by image analysis of FIGS. 5 and 6.

Of the variables of the probability density function, the data intervals x1 and x2 are given by the data interval of the volume-based histogram. Therefore, in order to fit a volume-based histogram using the synthesized probability density function, optimization was performed with least squares method using the variances σ1 and σ2, the averages μ1 and μ2, and the proportions p1 and p2 as variables to minimize the difference therebetween. The fitting results are shown in FIG. 9. From the probability density function of each of the first particle and the second particle given by the variable thus optimized, the normalized density function was accumulated to obtain a data interval value of 0.5, and median diameters $D_{50}$ of the first particle and the second particle. Further, a volume-based blending ratio (volume ratio) between the first particles and the second particles was obtained from the optimized ratio between p1 and p2.

As a result of the above analysis, the volume ratio between the first particles and the second particles was first particle:second particle=18:82, the median diameter $D_{50}$ of the first particles was 1.4 μm, and the median diameter $D_{50}$ of the second particles was 23.2 μm (including the thickness of the insulating film). From the comparison between the values of the median diameters $D_{50}$ of the first particles and the second particles before molding and the volume ratio between the first particles and the second particles at the time of blending and the values of the median diameters $D_{50}$ of the first particles and the second particles and the volume ratio between the first particles and the second particles obtained by the analysis, it was found that the median diameters $D_{50}$ and the volume ratios hardly changed before and after molding, and almost the same values were obtained. Therefore, the median diameters $D_{50}$ of the first particles and the second particles and the volume ratio between the first particles and the second particles in the molded body can be considered to be substantially the same values as the median diameters $D_{50}$ of the core portions of the first particles and the second particles and the volume ratio between the first particles and the second particles at the time of blending.

The analysis method described above is not limitedly applied to the analysis of the ring cross section, but can also be applied when the median diameter $D_{50}$ and volume ratio are calculated from the chip cross section of a commercially available product.

(Evaluation)

For each of the molded bodies of Examples 1 to 5 and Comparative Examples 1 to 3, relative permeability measurement and superposition measurement were performed. First, after the dimensions (inner diameter, outer diameter, and thickness) of the molded ring were measured, the relative permeability measurement and the superposition measurement were performed. The relative permeability measurement was performed using an impedance analyzer (E4991A manufactured by Keysight Technologies). The value of 1 MHz was adopted for the relative permeability measurement. The superimposition measurement was performed using an LCR meter (4284A manufactured by Keysight Technologies). In the superposition measurement, the ring was wound with a copper wire. A copper wire with a diameter of 0.35 mm was used, and the number of turns was 24. A direct current of 0 to 30 A was applied to the copper wire to acquire an inductance (L value). The relative permeability (μ value) was calculated from the L value, and the current value ($I_{sat}$) when the current value was reduced from the μ value at which the current is zero to the μ value of 80% was obtained. The magnetic field ($H_{sat}$) at which the μ value was 80% was calculated from $I_{sat}$, the dimensions of the ring, and the number of turns of copper wire. The test results are shown in Table 3. In this example, if the relative permeability is 22.0 or more, it was determined that a desired L value could be realized as an inductor, and if $H_{sat}$ is 13.0 kA/m or more, it was determined that a desired DC superposition characteristics could be realized as an inductor.

TABLE 3

| | First particle | Second particle | Second particle insulating film average thickness [nm] | Relative permeability | $H_{sat}$ [KA/m] |
|---|---|---|---|---|---|
| Comparative Example 1 | A4 | B1 | 13 | 27.5 | 10.1 |
| Comparative Example 2 | A4 | B2 | 32 | 25.2 | 11.7 |
| Example 1 | A4 | B3 | 40 | 24.9 | 13.1 |
| Example 2 | A4 | B4 | 69 | 24.0 | 17.6 |
| Example 3 | A4 | B5 | 78 | 23.4 | 18.7 |
| Example 4 | A4 | B6 | 89 | 22.5 | 20.5 |
| Example 5 | A4 | B7 | 100 | 22.0 | 21.0 |
| Comparative Example 3 | A4 | B8 | 124 | 21.2 | 22.0 |

From the results shown in Table 3, it is found that the relative permeability of the molded body composed of the magnetic material tends to be increased as the thicknesses of the insulating film of the second particles is reduced, and $H_{sat}$ tends to be increased as the thicknesses of the insulating film of the second particles are increased. In Comparative Examples 1 and 2 in which the thicknesses of the insulating film of the second particles were less than 40 nm, the relative permeability was a high value of 22.0 or more, but $H_{sat}$ was less than 13.0 kA/m, which did not satisfy the desired DC superposition characteristics as an inductor. On the other hand, in Comparative Example 3 in which the thicknesses of the insulating film of the second particles was more than 100 nm, $H_{sat}$ was a high value of 13.0 kA/m or more, but the relative permeability was less than 22.0, which did not satisfy the desired L value as an inductor.

In contrast, in Examples 1 to 5 in which the thicknesses of the insulating film of the second particles was 40 nm or more and 100 nm or less (i.e., from 40 nm to 100 nm), both a high relative permeability of 22.0 or more and a high $H_{sat}$ of 13.0 kA/m or more could be attained. Therefore, it can be said that the molded bodies of Examples 1 to 5 achieve a desired L value and DC superposition characteristics as an inductor.

Experiment 2

Using the first particles A1 to A6 and the second particles B5 having different median diameters $D_{50}$, the molded bodies of Examples 6 to 8 and Comparative Examples 4 to 5 were produced, and the physical properties were evaluated. The molded body was produced in the same procedure as in Examples 1 to 5 and Comparative Examples 1 to 3 described above. The types of particles used in each example and comparative example are as shown in Table 4. For each of the obtained molded bodies, physical properties were evaluated in the same procedure as in Examples 1 to 5 and Comparative Examples 1 to 3 described above. The test results are shown in Table 4. The median diameter $D_{50}$ of the first particles shown in Table 4 is a value measured for the carbonyl iron powder (core portion) before the insulating film is formed. However, as shown in Table 1, the thickness of the insulating film of the first particles is a very small value of about 1/100 or less of the median diameter $D_{50}$ of the carbonyl iron powder, and therefore, the median diameter $D_{50}$ of the first particles including the insulating film can be considered to be substantially the same value as the median diameter $D_{50}$ of the carbonyl iron powder before the insulating film is formed.

TABLE 4

| | First particle | Second particle | First particle $D_{50}$ [μm] | Relative permeability | $H_{sat}$ [kA/m] |
|---|---|---|---|---|---|
| Comparative Example 4 | A1 | B5 | 1.0 | 26.6 | 12.5 |
| Example 6 | A2 | B5 | 1.3 | 26.1 | 13.0 |
| Example 7 | A3 | B5 | 1.5 | 25.7 | 13.2 |
| Example 3 | A4 | B5 | 4.5 | 23.4 | 18.7 |
| Example 8 | A5 | B5 | 5.0 | 22.1 | 19.8 |
| Comparative Example 5 | A6 | B5 | 5.6 | 19.5 | 21.0 |

From the results shown in Table 4, it is found that the relative permeability of the molded body composed of the magnetic material tends to be increased as the median diameter $D_{50}$ of the first particles is reduced, and $H_{sat}$ tends to be increased as the median diameter $D_{50}$ of the first particles is increased. In Comparative Example 4 in which the median diameter $D_{50}$ of the first particles was less than 1.3 μm, the relative permeability was a high value of 22.0 or more, but $H_{sat}$ was less than 13.0 kA/m, which did not satisfy the desired DC superposition characteristics as an inductor. On the other hand, in Comparative Example 5 in which the median diameter $D_{50}$ of the first particles is more than 5.0 μm, $H_{sat}$ was a high value of 13.0 kA/m or more, but the relative permeability was less than 22.0, which did not satisfy the desired L value as an inductor.

In contrast, in Examples 3 and 6 to 8 in which the median diameter $D_{50}$ of the first particles was 1.3 μm or more and 5.0 μm or less (i.e., from 1.3 μm to 5.0 μm), both a high relative permeability of 22.0 or more and a high $H_{sat}$ of 13.0 kA/m or more could be attained. Therefore, it can be said that the molded bodies of Examples 1 to 5 achieve a desired L value and DC superposition characteristics as an inductor.

The present disclosure includes the following aspects, but is not limited to these aspects.

(First Aspect)

A composite magnetic material containing metal magnetic particles, in which the metal magnetic particles include first particles having a median diameter $D_{50}$ of 1.3 μm or more and 5.0 μm or less (i.e., from 1.3 μm to 5.0 μm), and second particles having a median diameter $D_{50}$ larger than the first particles. The first particles and the second particles each include a core portion made of a metal magnetic material, and an insulating film provided on a surface of the core portion. The insulating film of the second particles has an average thickness of 40 nm or more and 100 nm or less (i.e., from 40 nm to 100 nm). The insulating film of the first particles have an average thickness smaller than that of the insulating film of the second particles.

(Second Aspect)

The composite magnetic material according to the first aspect, in which the insulating film of the first particles have an average thickness of 10 nm or less.

(Third Aspect)

The composite magnetic material according to the first or second aspect, in which a volume ratio between the first particles and the second particles is in a range between 6:34 and 6:9.

(Fourth Aspect)

The composite magnetic material according to any one of the first to third aspects, in which the median diameter $D_{50}$ of the second particles is 3.8 times or more and times or less (i.e., from 3.8 times to 40 times) of the median diameter $D_{50}$ of the first particles.

(Fifth Aspect)

The composite magnetic material according to any one of the first to fourth aspects, in which the median diameter $D_{50}$ of the second particles is 20.0 μm or more and μm or less (i.e., from 20.0 μm to 30.0 μm).

(Sixth Aspect)

The composite magnetic material according to any one of the first to fifth aspects, in which the core portion of the first particle is composed of at least one alloy selected from the group consisting of FeSi alloy, FeSiCr alloy, FeSiAl alloy, FeCo alloy, and Fe amorphous alloy, or Fe.

(Seventh Aspect)

The composite magnetic material according to any one of the first to sixth aspects, in which the core portion of the second particle is composed of at least one alloy selected from the group consisting of FeSi alloy, FeSiCr alloy, FeSiAl alloy, FeCo alloy, FeNi alloy, and Fe amorphous alloy.

(Eighth Aspect)

The composite magnetic material according to any one of the first to seventh aspects, in which the insulating film of the first particles have a composition different from that of the insulating film of the second particles.

(Ninth Aspect)

The composite magnetic material according to the eighth aspect, in which one of the insulating film of the first particles and the insulating film of the second particles contains Si, and the other does not contain Si.

(Tenth Aspect)

The composite magnetic material according to any one of the first to ninth aspects, in which at least one of the insulating film of the first particles and the insulating film of the second particles is nonmagnetic.

(Eleventh Aspect)

The composite magnetic material according to any one of the first to tenth aspects, further including a resin.

(Twelfth Aspect)

An inductor using the composite magnetic material according to any one of the first to eleventh aspects.

Since an electronic component manufactured using the composite magnetic material according to the present disclosure can simultaneously attain both higher magnetic permeability and improved DC superposition characteristics, it can be widely used for various applications.

What is claimed is:

1. A composite magnetic material comprising metal magnetic particles, the metal magnetic particles including:

first particles having a median diameter $D_{50}$ of 1.3 μm to 5.0 μm, and second particles having a median diameter $D_{50}$ larger than the first particles, wherein the first particles and the second particles each include a core portion made of a metal magnetic material, and an insulating film on a surface of the core portion, the insulating film of the second particles has an average thickness of 40 nm to 100 nm, an average thickness of the insulating film of the first particles is smaller than that of the insulating film of the second particles, and at least one of the first particles or the second particles comprises a crystalline material or a crystalline phase.

2. The composite magnetic material according to claim 1, wherein the insulating film of the first particles has an average thickness of 10 nm or less.

3. The composite magnetic material according to claim 1, wherein a volume ratio between the first particles and the second particles is in a range between 6:34 and 6:9.

4. The composite magnetic material according to claim 1, wherein the median diameter $D_{50}$ of the second particles is from 3.8 times to 40 times larger than the median diameter $D_{50}$ of the first particles.

5. The composite magnetic material according to claim 1, wherein the median diameter $D_{50}$ of the second particles is from 20.0 μm to 30.0 μm.

6. The composite magnetic material according to claim 1, wherein the core portion of the first particle is composed of Fe, or at least one alloy selected from the group consisting of FeSi alloy, FeSiCr alloy, FeSiAl alloy, FeCo alloy, and Fe amorphous alloy.

7. The composite magnetic material according to claim 1, wherein the core portion of the second particle is composed of at least one alloy selected from the group consisting of FeSi alloy, FeSiCr alloy, FeSiAl alloy, FeCo alloy, FeNi alloy, and Fe amorphous alloy.

8. The composite magnetic material according to claim 1, wherein the insulating film of the first particles has a composition different from that of the insulating film of the second particles.

9. The composite magnetic material according to claim 8, wherein one of the insulating film of the first particles and the insulating film of the second particles contains Si, and the other does not contain Si.

10. The composite magnetic material according to claim 1, wherein at least one of the insulating films of the first particles and the insulating films of the second particles is nonmagnetic.

11. The composite magnetic material according to claim 1, further comprising a resin.

12. An inductor including the composite magnetic material according to claim 1.

13. The composite magnetic material according to claim 2, wherein a volume ratio between the first particles and the second particles is in a range between 6:34 and 6:9.

14. The composite magnetic material according to claim 2, wherein the median diameter $D_{50}$ of the second particles is from 3.8 times to 40 times larger than the median diameter $D_{50}$ of the first particles.

15. The composite magnetic material according to claim 2, wherein the median diameter $D_{50}$ of the second particles is from 20.0 μm to 30.0 μm.

16. The composite magnetic material according to claim 2, wherein the core portion of the first particle is composed of Fe, or at least one alloy selected from the group consisting of FeSi alloy, FeSiCr alloy, FeSiAl alloy, FeCo alloy, and Fe amorphous alloy.

17. The composite magnetic material according to claim 2, wherein the core portion of the second particle is composed of at least one alloy selected from the group consisting of FeSi alloy, FeSiCr alloy, FeSiAl alloy, FeCo alloy, FeNi alloy, and Fe amorphous alloy.

18. The composite magnetic material according to claim 2, wherein the insulating film of the first particles has a composition different from that of the insulating film of the second particles.

19. The composite magnetic material according to claim 2, wherein at least one of the insulating films of the first particles and the insulating films of the second particles is nonmagnetic.

20. The composite magnetic material according to claim 1, wherein the metal magnetic material includes at least an Fe-based material.

* * * * *